(12) United States Patent
Hall et al.

(10) Patent No.: US 12,319,133 B2
(45) Date of Patent: Jun. 3, 2025

(54) ELECTRIC VEHICLE BATTERY COMPARTMENT

(71) Applicant: Vanderhall Motor Works, Inc., Provo, UT (US)

(72) Inventors: Stephen Hall, Provo, UT (US); Christopher Johnson, Provo, UT (US); Travis Niederhauser, Provo, UT (US)

(73) Assignee: Vanderhall Motor Works Inc., Provo, UT (US)

( * ) Notice: Subject to any disclaimer, the term of this patent is extended or adjusted under 35 U.S.C. 154(b) by 321 days.

(21) Appl. No.: 17/878,793

(22) Filed: Aug. 1, 2022

(65) Prior Publication Data
US 2024/0034139 A1 Feb. 1, 2024

Related U.S. Application Data

(60) Provisional application No. 63/228,139, filed on Aug. 1, 2021.

(51) Int. Cl.
| | | |
|---|---|---|
| *B60K 1/04* | (2019.01) | |
| *B60L 50/60* | (2019.01) | |
| *B60L 50/64* | (2019.01) | |
| B60L 58/26 | (2019.01) | |

(52) U.S. Cl.
CPC ............ *B60K 1/04* (2013.01); *B60L 50/64* (2019.02); *B60L 50/66* (2019.02); *B60K 2001/0438* (2013.01); *B60L 58/26* (2019.02)

(58) Field of Classification Search
CPC .......... B60L 50/64; B60L 50/66; B60K 1/04; B60K 2001/0438
See application file for complete search history.

(56) References Cited

U.S. PATENT DOCUMENTS

| | | | |
|---|---|---|---|
| 9,214,658 B2 * | 12/2015 | Lee | B60L 50/64 |
| 11,588,199 B2 * | 2/2023 | Ramadan | B60L 50/66 |
| 2012/0175177 A1 * | 7/2012 | Lee | B60K 1/04 |
| | | | 180/68.5 |
| 2014/0284125 A1 * | 9/2014 | Katayama | B60L 58/21 |
| | | | 180/68.5 |
| 2015/0083507 A1 * | 3/2015 | Keller | B62D 21/152 |
| | | | 180/68.5 |
| 2018/0261899 A1 * | 9/2018 | Milton | H01M 10/6556 |
| 2020/0101879 A1 * | 4/2020 | Sakai | B60N 2/502 |
| 2020/0338991 A1 * | 10/2020 | Sopel | H01M 50/249 |
| 2021/0170852 A1 * | 6/2021 | Fan | A01D 34/78 |
| 2021/0276455 A1 * | 9/2021 | David | H01M 10/66 |
| 2022/0285780 A1 * | 9/2022 | Cho | H01M 50/264 |

* cited by examiner

*Primary Examiner* — Brian L Swenson

(57) ABSTRACT

An electric vehicle may include a frame, wheel assemblies, an electric motor, a rechargeable battery, and a battery compartment in which the rechargeable battery is secured to the vehicle. The electric motor may be supported by and/or coupled to the unitized frame. The electric motor may be coupled to at least one of the wheel assemblies. The rechargeable battery may be electrically coupled to the electric motor and power the electric motor. The rechargeable battery may be housed by and/or within the battery compartment. The battery compartment may be disposed above the frame and along a longitudinal centerline of the vehicle. The battery compartment may have a length of one-third or more of the longitudinal length of the frame. The length of the battery compartment may be more than three times a width of the battery compartment.

19 Claims, 15 Drawing Sheets

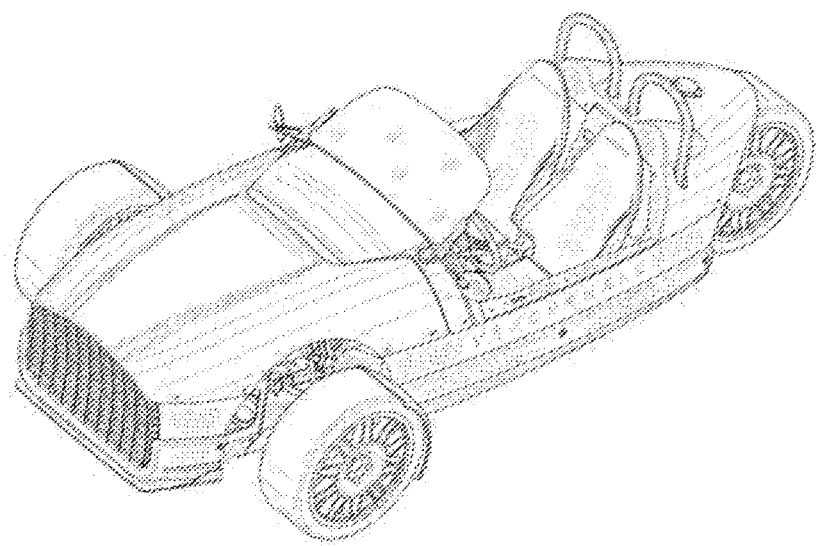
FIG. 21
FIG. 22
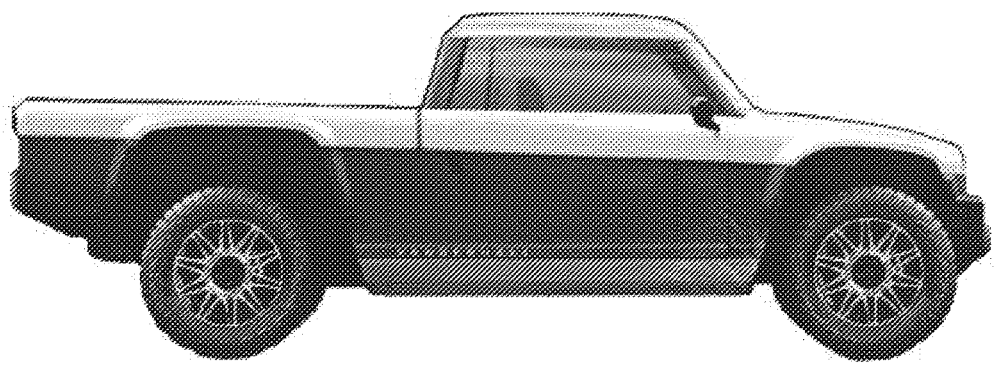
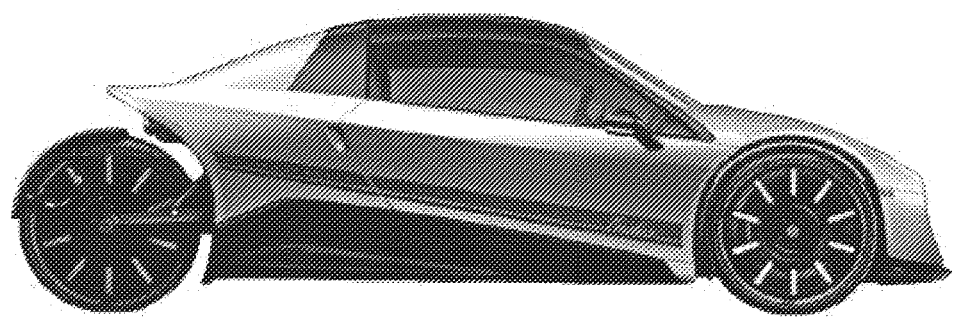
FIG. 23
FIG. 24

ELECTRIC VEHICLE BATTERY COMPARTMENT

CROSS-REFERENCE TO RELATED APPLICATIONS

The present application claims priority to U.S. Provisional Patent Application No. 63/228,139 entitled "ELECTRIC VEHICLE WITH BATTERY COMPARTMENT", filed on Aug. 1, 2021. The entire contents of the above-listed application are hereby incorporated by reference for all purposes.

BACKGROUND

The electric vehicle revolution is in full swing. Encouraged by new, more cost-effective battery technologies, virtually all the world's major auto manufacturers have begun developing or producing electric passenger and/or commercial vehicles. Such vehicles are generally designed to operate on public roadways and highways, with various aspects of the vehicles, such as the frame and suspension, tailored for on-road use. Slower on the uptake has been the off-road power sports and utility vehicle industry, which is a subset of the motor vehicle industry that produces vehicles tailored for off-road use. Off-road power sports and utility vehicles are generally driven on more challenging terrain. The various uses of these off-road vehicles demand different functional and design considerations from the on-road counterparts.

BRIEF DESCRIPTION OF THE DRAWINGS

The present description will be understood more fully when viewed in conjunction with the accompanying drawings of various examples of electric vehicles. The description is not meant to limit the electric vehicles to the specific examples. Rather, the specific examples depicted and described are provided for explanation and understanding of electric vehicles. Throughout the description the drawings may be referred to as drawings, figures, and/or FIGs.

FIG. 21 is a perspective view of an autocycle powered by the battery system.

FIG. 22 is a side view of a utility vehicle powered by the battery system.

FIG. 23 is a side view of a light, enclosed autocycle powered by the battery system.

FIG. 24 is a side view of a boat powered by the battery system.

DETAILED DESCRIPTION

Figure 1A:
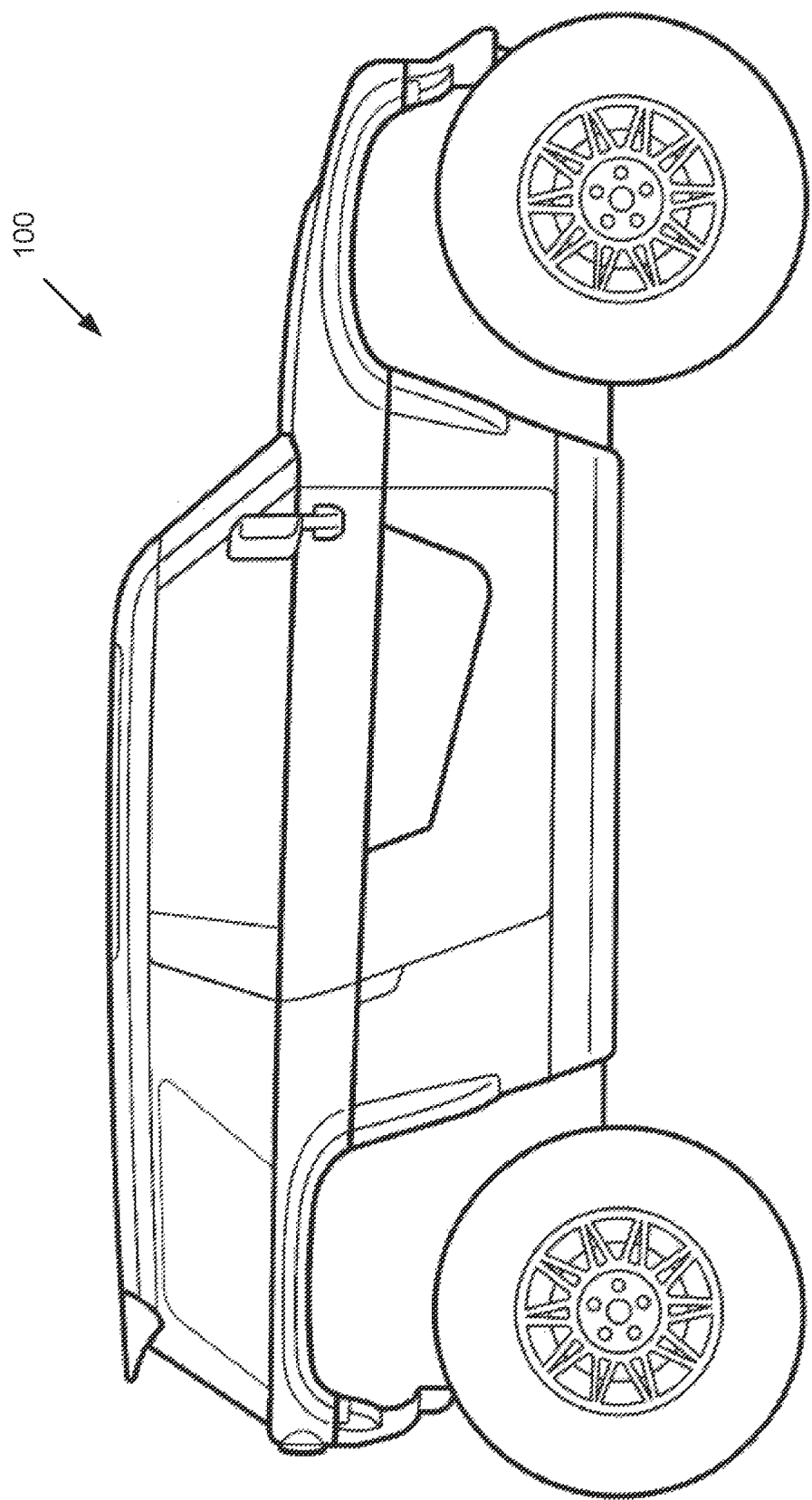
FIG. 1A is a side view of an off-road electric vehicle.

An electric vehicle as disclosed herein will become better understood through a review of the following detailed description in conjunction with the figures. The detailed description and figures provide merely examples of the various embodiments of electric vehicles. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional electric vehicle, such as current on-road vehicles, may have its batteries stored in a trunk of the vehicle, in a frunk of the vehicle (i.e., a front trunk), or, like vehicle models sold by Tesla, Inc., along the undercarriage of the vehicle. Such configurations may be motivated by overall vehicle designs currently accepted or demanded by the market. Or, such configurations may be designed to accommodate servicing or replacing batteries. However, the configurations suitable for on-road vehicles are not suitable for off-road vehicles. A primary design consideration for off-road vehicles is having sufficient ground clearance to navigate rough terrain and accommodate a larger range of travel of the vehicle's suspension. Additionally, it can be more important for an off-road vehicle's weight balance to be more evenly distributed between the front and rear wheels to ensure maximum traction and control while driving over rough or uneven terrain.

Additionally, conventional on-road vehicles tend to be larger than their off-road counterparts. This is due, in part, to the narrower size of off-road trails compared with paved roads and highways. Additionally, it is advantageous to have a smaller profile and lower weight in an off-road vehicle to navigate more dense terrain, as such may improve handling on off-road trails and reduce the likelihood of getting stuck on difficult terrain. Because of their smaller size-conventional off-road vehicles also tend to have fewer creature comforts.

Implementations of electric vehicles as described herein may address some or all of the problems described above. An electric vehicle may include a frame, wheel assemblies attached to the unitized frame via a suspension system, an electric motor, a rechargeable battery, and a battery compartment in which the rechargeable battery is secured to the vehicle. The suspension system may include an upper control arm, a lower control arm, and a strut and/or shock that couple the wheel assembly, including a wheel hub and corresponding wheel and tire, to the frame. The electric motor may be supported by and/or coupled to the unitized frame. The electric motor may be coupled to at least one of the wheel assemblies via a rotor that transfers power from the electric motor to the wheel assembly. For example, the output rotor of the electric motor may be coupled to a CV axle, which is coupled at an opposite end to the wheel hub.

The rechargeable battery may be electrically coupled to the electric motor and power the electric motor. The rechargeable battery may be housed by and/or within the battery compartment. The battery compartment may be disposed above the frame and along a longitudinal centerline of the vehicle. The battery compartment may have a length of one-third or more of the longitudinal length of the frame. The length of the battery compartment may be more than three times a width of the battery compartment.

In some implementations, the battery compartment may be formed by a first vertical wall on a first side of the longitudinal centerline, and a second vertical wall on a second side of the longitudinal centerline. The frame may include a floor, a front wall, and a rear wall. The first and second vertical walls may extend up from the floor. The first and second vertical walls may extend from the rear wall to the front wall. Indeed, the first and second vertical walls may be coupled to and/or integrated with the frame, such as using a tab-and-slot construction. The first and second walls may be formed of the same material as the frame.

In various implementations, the battery compartment may include a cover on a top side of the battery compartment and an impact plate along a bottom side of the battery compartment. The cover may be removable, moveable, or articulable, and may serve to enclose the batteries within the battery compartment. The impact plate may protect the batteries and/or various other components within the battery compartment from impacts with terrain and/or other off-road hazards. The impact plate may be made of the same material as the frame. The impact plate may be made of a material with a higher impact resistance than the material used for the frame. In various implementations, the impact plate may comprise titanium.

The battery compartment functions to preserve the integrity of the batteries and more evenly distribute the weight of the vehicle between the front and rear wheels. The battery compartment may provide greater protection for the batteries from debris, terrain, and/or other off-road hazards, and may allow for greater ground clearance. The position and structure of the battery compartment make the batteries more easily accessible for servicing and replacement.

Various implementations of electric vehicles described herein may include a battery, a drive axle, a drive wheel coupled to the drive axle, and a combined motor and brake unit. The combined motor and brake unit may be electrically coupled to the battery and mechanically coupled to the drive axle. The combined motor and brake unit may include a housing, an electric motor inside the housing and electrically coupled to the battery, a transmission inside the housing, a motor output shaft, a braking mechanism, and a motor input shaft. The transmission may transmit rotation of the electric motor to the drive axle and the drive wheel. The drive axle may be directly or indirectly coupled to the transmission. The motor output shaft may couple the electric motor to the transmission and output rotation of the electric motor to the transmission. The braking mechanism may be coupled to the housing. The motor input shaft may couple the electric motor to the braking mechanism and input, to the electric motor, a braking force applied by the braking mechanism to the motor input shaft. The braking force may slow the rotation of the electric motor.

Some electric vehicles described herein may include a heating and cooling system. An electric vehicle may include a battery module, a heat transfer circuit, and a ventilation system. The heat transfer circuit may include a first heat exchanger, a second heat exchanger, and a reversing valve. The first heat exchanger may be adjacent to the battery module and/or in thermal contact with the battery module. The second heat exchanger may exchanges heat with an environment external to a cabin of the vehicle. The reversing valve may reverse a fluid flow direction of the heat transfer circuit. The ventilation system may forces air across the first heat exchanger or the second heat exchanger and direct the air into the cabin of the vehicle.

FIG. 1A is a side view of an off-road electric vehicle 100. An off-road vehicle is shown, although other types of vehicles may employ the various systems and components described herein, such as motorcycles, autocycles (see FIGS. 21, a perspective view of an autocycle powered by the battery system, and 23, a side view of a light, enclosed autocycle powered by the battery system), passenger cars, utility vehicles (See FIG. 22, a side view of a utility vehicle powered by the battery system), light and heavy-duty trucks, and even watercraft (see FIG. 24, a side view of a boat powered by the battery system).

Figure 1C:
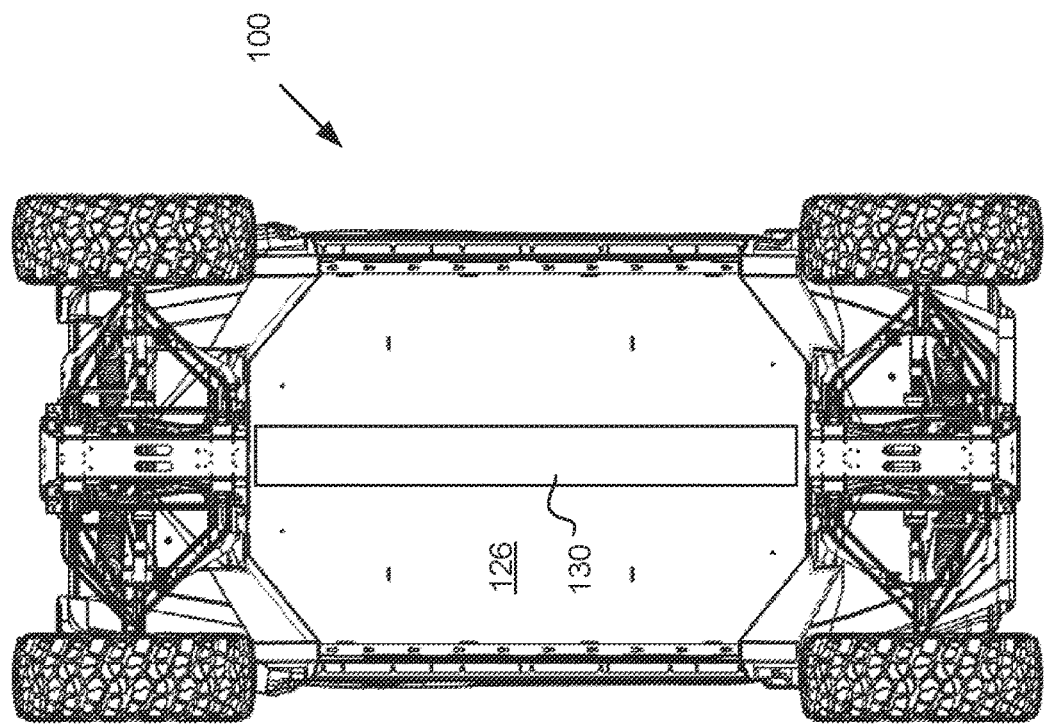
FIG. 1C is a bottom view of an off-road electric vehicle.
Figure 1B:
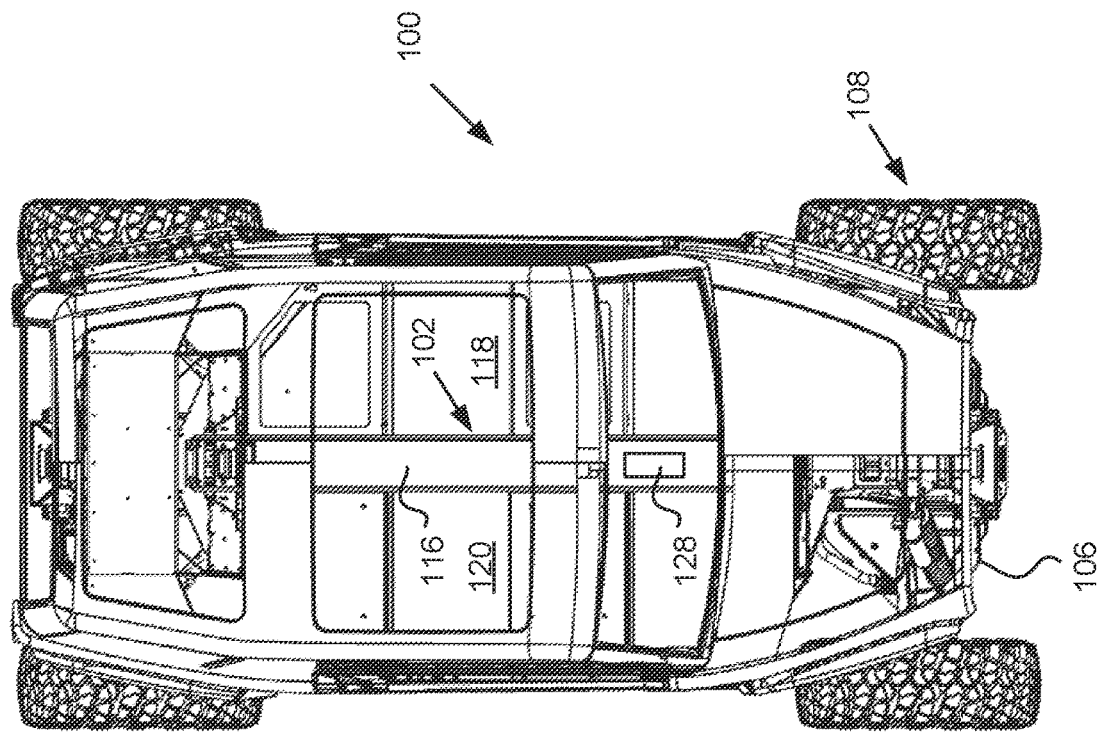
FIG. 1B is a top view of an off-road electric vehicle with various parts removed to show detail.
Figure 1D:
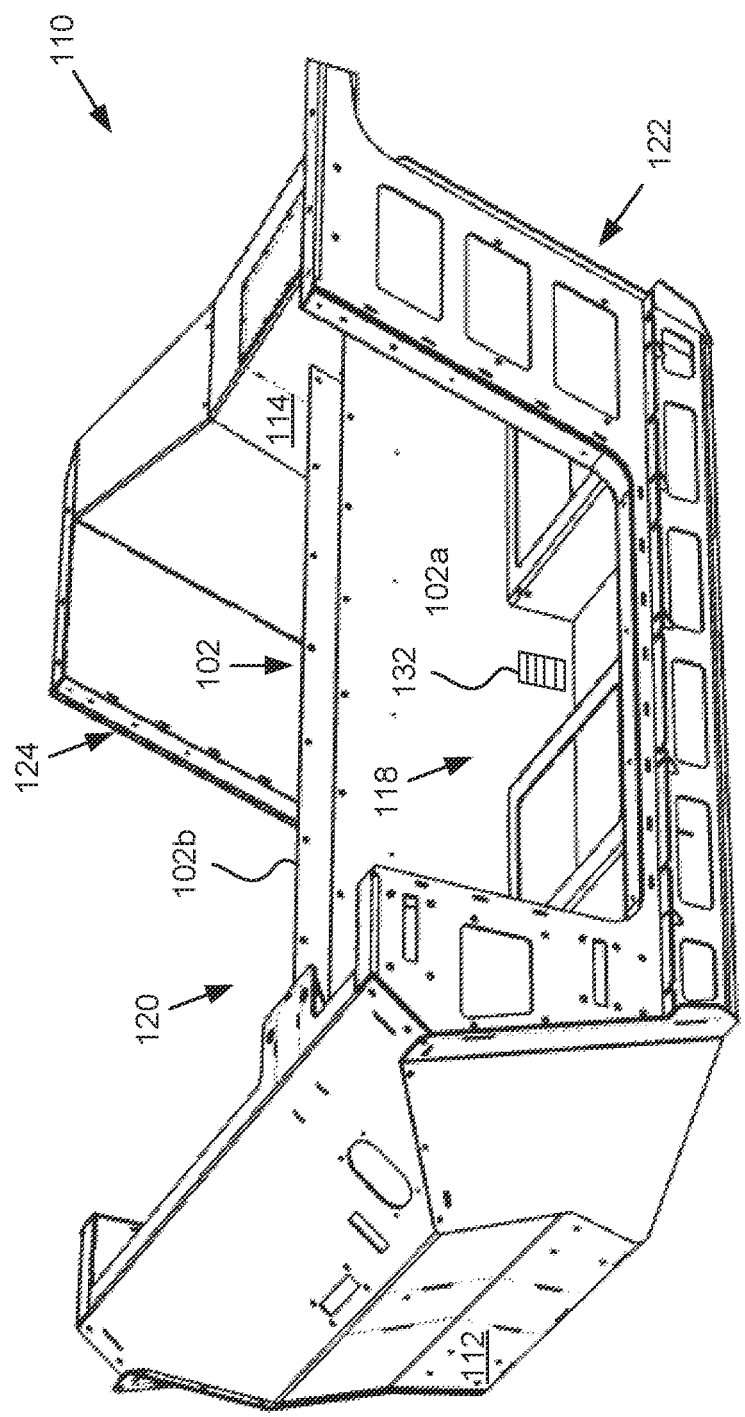
FIG. 1D is a perspective view of a unitized frame of an off-road vehicle.

A battery of rechargeable cells, such as that shown in FIG. 2 and described in detail below, is configured to power the electric motor(s). FIGS. 1B and 1D illustrate a placement of the battery compartment 102 in the vehicle 100. FIG. 1B is a top view of an off-road electric vehicle with various parts removed to show detail. FIG. 1C is a bottom view of an off-road electric vehicle. FIG. 1D is a perspective view of a unitized frame 110 of an off-road vehicle.

The vehicle 100 includes a frame, four wheels 106 and four suspension arms 108. Naturally, each suspension arm may be comprised of multiple components, as shown in FIG. 1B. Each suspension arm is pivotally attached to the frame and couples one of the four wheels to the frame. The vehicle also includes at least one electric motor (See FIG. 2) supported on the frame and configured to drive at least one of the four wheels. The vehicle may include 4 electric motors, as shown in FIG. 2.

As seen in these FIGS. 1B-D, the battery compartment may be in the shape of a rectangular prism, or box. This box may be disposed above the frame 110. This may be advantageous, for example, when the vehicle is an off-road vehicle with a high clearance. The clearance of the off-road vehicle may be between 12 and 24 inches, where the clearance is a distance from flat ground to a bottom side of the frame 110. In some implementations, the clearance may be approximately 18 inches.

The shape of the battery compartment may be elongate, e.g. a longitudinal length of the battery compartment may be more than four times a width of the battery compartment. The compartment may extend more than half of the longitudinal centerline of the vehicle 100 and/or the frame 110. The longitudinal length of the battery compartment may be more than half of a longitudinal length of the unitized frame, more than two-thirds a longitudinal length of the unitized frame; or more than three-quarters a longitudinal length of the unitized frame. The battery compartment may extend an entire length from a front panel 112 of the unitized frame to a rear panel 114 of the unitized frame.

The battery compartment 102 may be disposed between a first seat well 118 on a first side of the battery compartment and a second seat 120 well on a second side of the battery compartment opposite the first side of the battery compartment. A width of the first seat well may be substantially the same as a width of the second seat well. The first seat well may be defined by a first longitudinal wall 102a of the battery compartment 102, a front wall 112 of the unitized frame 110, a rear wall 114 of the unitized frame, and a first side wall 122 of the unitized frame. The first side wall may have an access cutout through which a passenger enters the first seat well. The second seat well may be defined by a second longitudinal wall 102b of the battery compartment, the front wall 112 of the unitized frame 110, the rear wall 114 of the unitized frame 110, and a second side wall 124 of the unitized frame. The second side wall may include an access cutout through which a passenger enters the second seat well. One or more doors may be attached to the frame 110 and close off the access points. The first and/or second seat wells may be formed at least in part by a floor 126 of the frame 110. The battery compartment 102 may be disposed between the first seat well 118 and the second seat well 120. The battery compartment may further formed by a cover 116 that couples to the first vertical wall or the second vertical wall of the battery compartment and extends from the first vertical wall to the second vertical wall.

As can be seen in FIGS. 1B and 1D, the battery compartment 102 is visible in the vehicle cabin. A cover material may be added to various external surfaces of the battery compartment to avoid detracting from an aesthetic of the cabin. In various implementations, the cover material may include padding, such as on the top and sides of the compartment, for comfort and safety. The top side of the battery compartment may, for example, forms an arm rest of a driver-side seat on a driver's side of the vehicle and a passenger-side seat on a passenger's side of the electric vehicle This placement of the battery compartment does not reduce the leg room for any of the passengers in the cabin as with some previous electric vehicle designs. The battery compartment may extend above and between a driver's foot well and a front passenger's foot well, e.g., the first and second seat wells 118 and 120.

The battery compartment may provide access to the battery from above, such as by removing the cover, to perform service and/or maintenance on the batteries and/or other components in the battery compartment. For example, the battery system may include a manual disconnection switch for use in an emergency or during maintenance. Accordingly, the cover or a portion of the cover may be attached to a side wall of the battery compartment 102, the front wall 112, and/or the rear wall 114 by a hinge or a latching mechanism. In some implementations, the battery compartment includes an access panel 128 on a top side of the battery compartment. The access panel may be a hinged door. In general, all or a portion of the cover may be a service panel that is movable between an opened position and a closed position, and/or that is removable from the battery compartment. In some examples, the cover consists of or comprises two or more separable segments separable from each other and separably removable from over the battery compartment.

The battery compartment may additionally include one or more vents 132 coupled to a ventilation system of the vehicle. Air blown across the batteries and/or a heat exchanger in the battery compartment may be blown out of the vents and into the cabin.

The off-road electric vehicle 100 may include an impact plate 130 that protects the battery compartment and/or the battery from impacts with hazards, terrain, debris, and so forth. The impact plate may be on a top side of the floor 126 adjacent to the battery compartment. The impact plate may be on a bottom side of the floor 126 such that the floor of the frame is between the impact plate and the battery compartment. The impact plate may be formed of a material having a higher impact resistance than a material forming the floor. For example, the floor may be formed of aluminum alloy and the impact plate may be formed of a titanium alloy. The impact plate may have a width greater than a width of the battery compartment and less than a width of the floor.

The battery compartment may be sized to hold multiple stacks of battery cells, to thereby give the option of adding more stacks to have increased range or reducing the number of stacks to reduce the weight of the vehicle.

Figure 2:
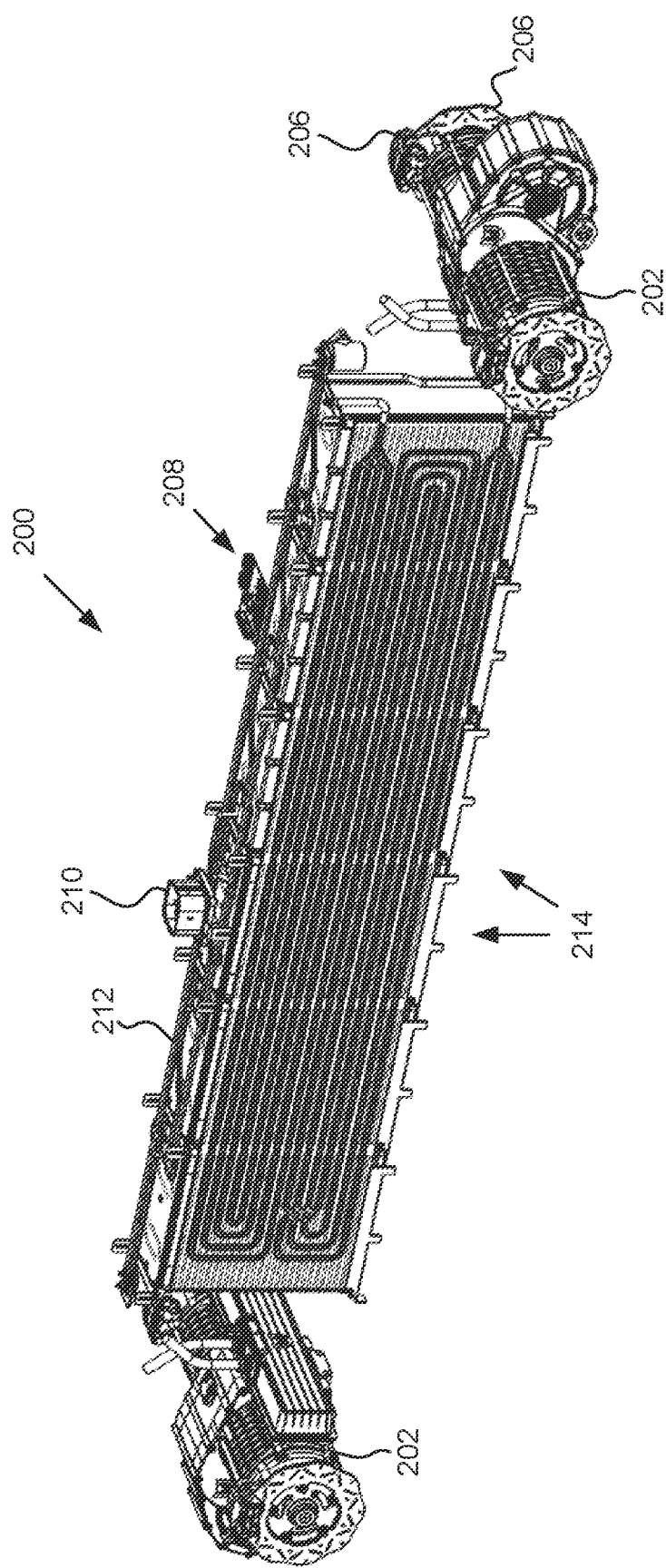
FIG. 2 is a schematic view showing a battery system and units which power an electric vehicle.

FIG. 2 is a schematic view showing a battery system and motors which power an electric vehicle. The battery system of the vehicle may employ an active cooling system. FIG. 2 is a perspective view of an implementation of a battery system 200 with the electric motors 202. As shown here, there are 4 electric motors. As will be discussed in detail above, the front motors may be paired in a single housing unit, and the back motors may be paired in a single housing unit. Four brakes 206, one for each motor, are attached to the housing units. The battery system may be enclosed within a battery compartment. The location of the battery compartment in the vehicle will be discussed in detail below.

The implementation shown in FIG. 2 includes 6 stacks 214 of cells. These stacks will be discussed in more detail below.

The battery system includes conductors 212 for carrying current from the battery to the motors. The system also includes a manual disconnect switch 210, which can be used in an emergency or during maintenance to disconnect the battery system from the rest of the vehicle. A control board 208 is shown and will be discussed in connection with FIG. 4.

Figure 3:
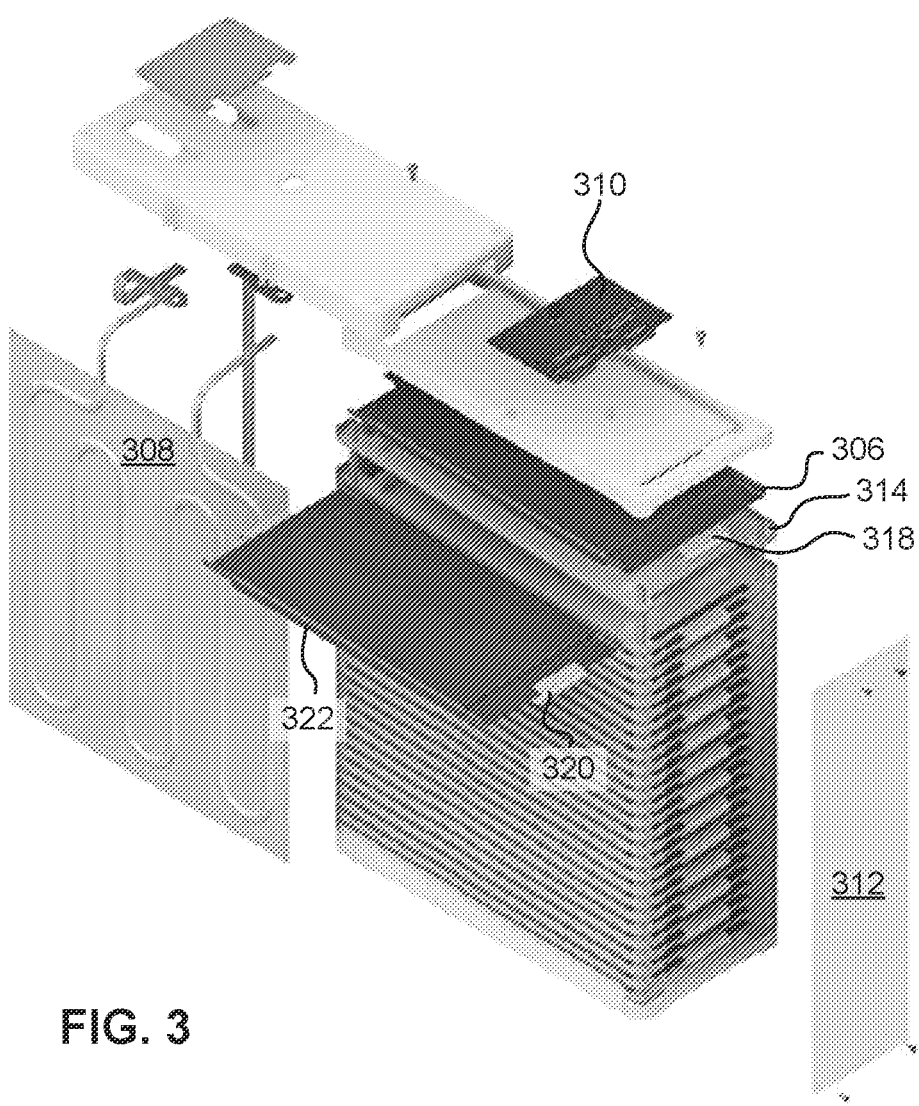
FIG. 3 is an exploded view showing the battery system with a temperature control system.

FIG. 3 is an exploded view showing the battery system with a temperature control system. FIG. 3 shows the components of a stack of cells. The individual cells 306 may be lithium-ion cells. The individual cells may be pouch cells. Pouch cells may be approximately flat, meaning they each have two generally planar opposing major surfaces. As such, a large surface area may be presented to the heat distribution plates, for efficient heat transfer.

Each cell 306 includes a positive terminal 318, in the form of a curved metal foil, protruding from one end and a negative terminal 320, also in the form of a curved metal foil, protruding from the other end. In the implementation shown, the pouch cells are rated at 65 Ah and use a lithium NMC (nickel-manganese-cobalt) chemistry. Certainly, other ratings and chemistries, such as lithium NCA (nickel-cobalt-aluminum) can be used.

Figure 5:
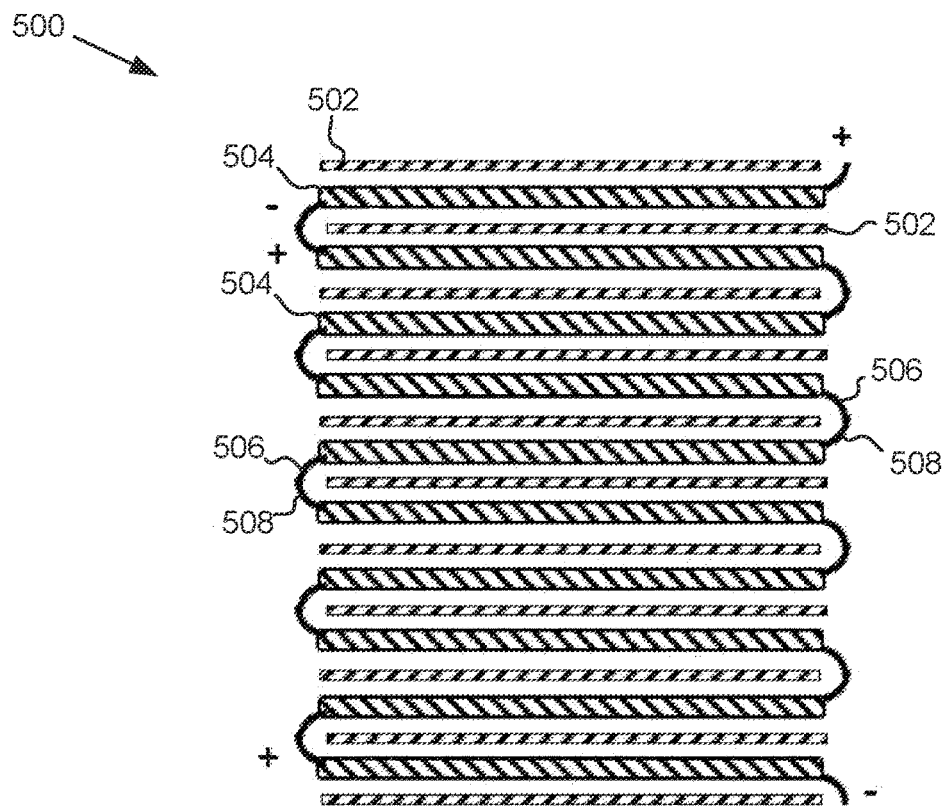
FIG. 5 is a schematic cross section of a stack of battery cells with heat transfer plates between the cells.

The cells are placed in the stack in series. This is accomplished by alternating the orientation of the cells as they are placed in the stack. In particular, if the bottom cell has the positive terminal on the right and the negative terminal is on the left, the next cell up in the stack is flipped over so that the negative terminal is on the right and the positive terminal is on the left. This pattern is repeated, so that so long as an even number of cells is placed in the stack, the exposed cell terminal at the bottom of the stack is the opposite as the exposed cell terminal on top of the stack. This alternating pattern is illustrated in FIG. 5.

As seen in FIG. 2, the battery may include 6 stacks. One or more of the stacks may include between 10 and 60 cells, between 20 and 50 cells, or 30 cells. If 65 Ah cells are used, the power rating for the entire stack may be in a range from 3 to 20 kW-hrs, from 6 to 15 kW-hrs, or approximately 10 kW-hrs.

Turning back to FIG. 3, each cell stack may include its own battery management system (BMS) controller, such as that shown at 310. Through the BMS, the temperature, current, and performance of each cell is monitored and controlled.

Figure 13:
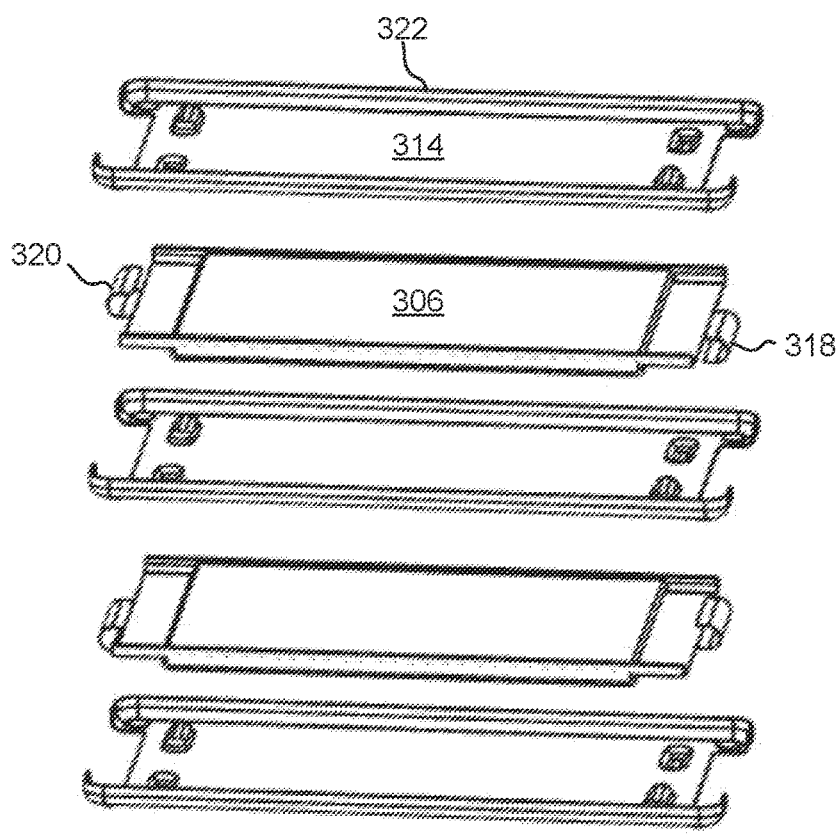
FIG. 13 is an exploded view of the cells and heat transfer plates for a stack of cells.

As shown in this implementation in FIG. 3, disposed between each of the cells 306 is a heat transfer plate 314. These plates are made from a heat conductive material, such as an aluminum alloy. As best seen in FIG. 13, each plate 314 is formed in a tray shape so that the cells 306 can lie therein. Also, it is advantageous to have the heat transfer plates 314 surround the cells 306 as much as possible, in order to capture as much heat as possible from the cells. Each plate 314 also includes cutouts so that the cell terminals 318 and 320 can contact those from the cells immediately above and immediately below. the busbars. The sides 322 of the plates are shaped to provide a good surface area to physically contact the heat exchange wall 308. Although difficult to see in this FIG., the stack is held together by 4 posts, on at each corner that pass through holes in the heat transfer plates, located where the cells do not lie.

The implementations include a circuit for circulating a heat transfer fluid. This circuit includes conduits in fluid communication with a device configured to cool the heat transfer fluid. At least one conduit is in thermal contact with each heat transfer plate. As seen in FIGS. 3 and 7-12, this may be by a heat transfer wall, such as that shown as 308 in FIGS. 3 and 704 in FIGS. 7-12. In alternative implementations, this is accomplished by a collection of separate conduits.

Figure 7:
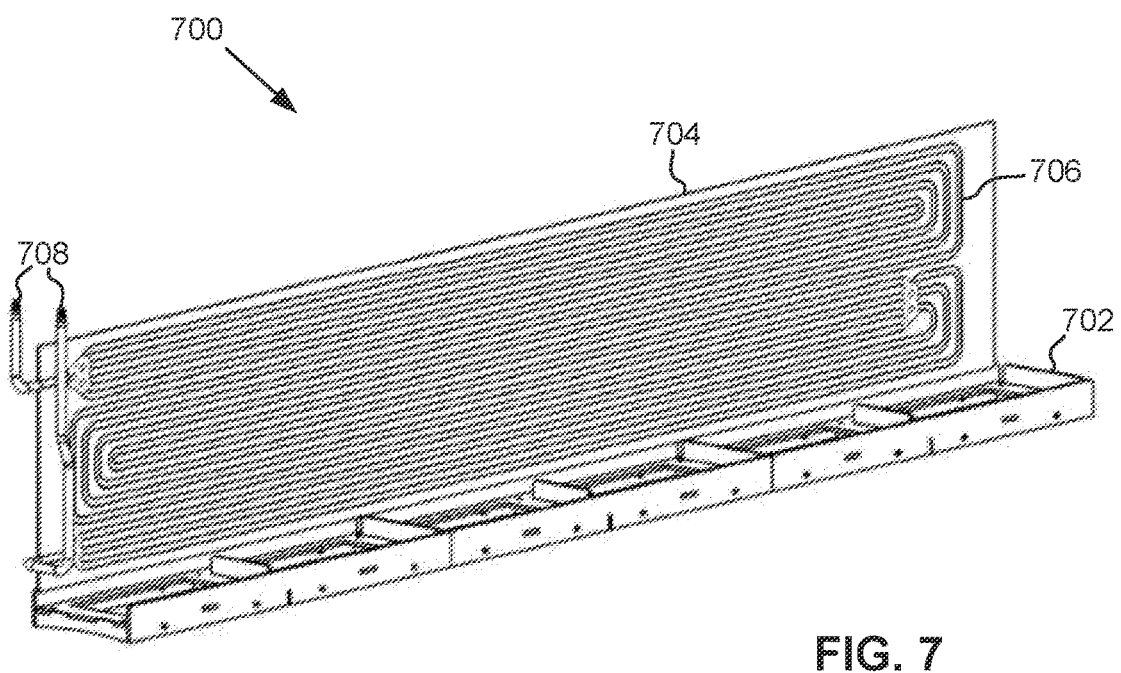
FIG. 7 perspective view of a heat exchanger.

This heat transfer wall is formed from a heat conducting material, such as an aluminum alloy. Although other materials, such as copper alloys may be used. Nevertheless, aluminum may be used because of its lighter weight and lower cost. As seen in FIG. 7, the heat transfer wall 704 includes conduits 706 formed therein.

In one implementation, these conduits are configured to carry a heat transfer fluid, such as freon, which is also a refrigerant. In this implementation, a reversible heat pump, when set in cooling mode, is used to pressurize the refrigerant. As it expands within the conduits, it takes heat away from, i.e. cools, the heat transfer wall. The heat transfer plates in the stacks are in contact with the heat transfer wall and are thus also cooled. The cooled heat transfer plates, in turn, cool the cells of the battery.

When set in heating mode, the heat pump warms the heat transfer wall as the refrigerant is compressed in the conduits. As such, the heat transfer wall warms the heat transfer plates and the cells are warmed.

In an alternative implementation, the fluid in the conduits of the heat transfer wall is not a refrigerant, but rather a convention heat radiating fluid, such as ethylene glycol that is circulated through the conduits and through a device that is configured to cool and warm the fluid. In other words, in this alternative implementation, a device, such as a reversible heat pump, has its own circuit and the heat transfer wall has its own circuit. The two circuits are brought together at a heat exchanging point to either exchange cool or heat.

In this implementation shown in FIGS. 7-12, a single heat transfer wall is used on each side of the battery, i.e. for all 6 stacks. In alternative implementations, the heat transfer walls are sized for fit a single stack of cells. In other words, in these implementations, each cell has it's own heat transfer wall, if only on one side, or it's own two heat transfer walls, if on both sides. These implementations may be better adapted for using the modular nature of the battery system. That is, the vehicle designer can add as many stacks to the vehicle as is necessary for its purpose. Such single stack heat transfer walls are configured with inlets and outlets for rapid and secure connection to the rest of the circuit including the heat transfer device.

Figure 4:
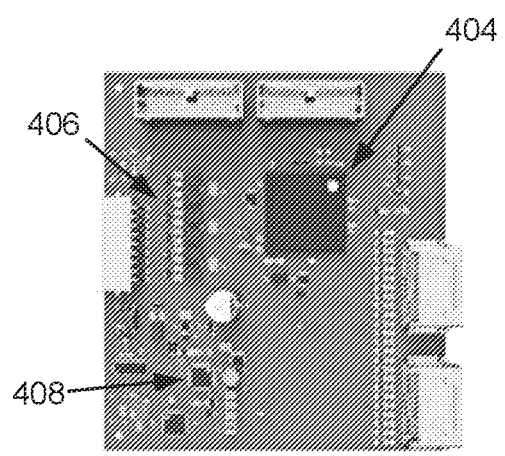
FIG. 4 is a schematic view of an electronic control board of the battery system.

FIG. 4 is a schematic view of an electronic control board of the battery system. As seen in FIG. 4, the vehicle may include a master controller. The master controller includes a main processor 404 for vehicle systems, resettable virtual fuses 406 and a central BMS control processor 408.

FIG. 5 is a schematic cross section of a stack of battery cells with heat transfer plates between the cells. For clarity in this FIG. 5, a space is left between the heat transfer plates 502 and the cells 504. Nevertheless, it is to be understood that optimal heat transfer may occur with the cells in direct physical contact with the heat exchange plates.

In this implementation of FIG. 5, a heat transfer plate 502 is disposed between each cell 504. Another way to express this is that the number of heat transfer plates is n and the number of cells is n−1. In other words, there is one more heat transfer plate than cells, so that a heat transfer plate sits atop and below the stack.

As noted above, this FIG. 5 also depicts the alternating orientation of the cells, so that the positive terminal 508 is on the right side on the top cell, but on the left side of the cell just below it. The opposite is true for the negative terminal 506. As a result, a positive terminal is exposed on the top of the stack and a negative terminal is exposed on the same side at the bottom of the stack.

In some implementations, the top heat transfer plate and bottom heat transfer plate is identical to the other heat transfer plates in the stack. Alternatively, the top and/or the bottom heat transfer plate may be configured differently, in order to accommodate mechanical or electrical connection of the stack in the battery.

Figure 6:
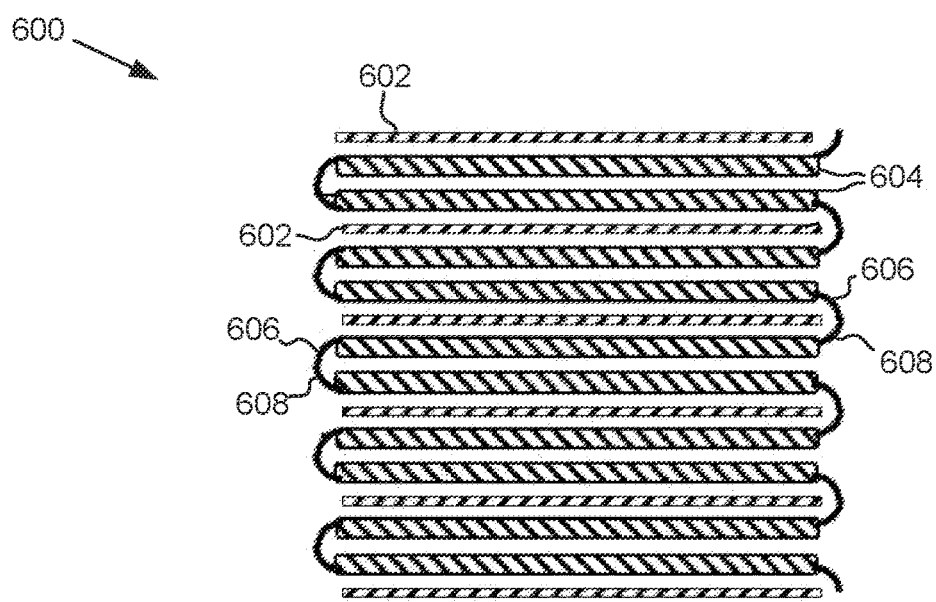
FIG. 6 is a schematic cross section of the stack of cells with heat transfer plates between every other cell.

FIG. 6 is a schematic cross section of the stack of cells with heat transfer plates between every other cell. FIG. 6, which also shows a space between cells and plates for clarity, shows an alternative implementation, wherein a heat transfer plate 602 is disposed between every other cell 604. In this implementation, if the number of heat transfer plates is n, then the number of cells is (n−1)×2. In this implementation, every cell has at least one major surface in contact with a heat transfer plate.

FIG. 7 perspective view of a heat exchanger 700 that exchanges heat with the vehicle battery. FIG. 7 shows the heat transfer wall 704 and the base 702 for the battery system. As seen, the base 702 is configured to hold multiple stacks of cells, such as 6, shown here. Also depicted are the inlet 708 and outlet 710 for the conduits/tubes 706. The conduits may carry a heat exchange fluid such as a refrigerant, and may extend between an expander and a compressor.

The vehicle may include a heating and cooling system, which may include a heat transfer circuit. The heat transfer circuit may include the first heat exchanger 700, which may be adjacent to the battery module and/or in thermal contact with a plurality of the trays that hold the battery cells. The first heat exchanger may accordingly regulate a temperature of the set of battery cells by drawing heat from or passing heat to the trays and the battery cells. The heat transfer circuit may include a second heat exchanger that exchanges heat with an environment external to a cabin of the vehicle. The heat transfer circuit may include a reversing valve that reverses a fluid flow direction of the heat transfer circuit. In one configuration, the first heat exchanger may act as a condenser and the second heat exchanger may act as an evaporator. In a reverse configuration, the first heat exchanger may act as the evaporator and the second heat exchanger may act as the condenser. The heating and cooling system may additionally include a ventilation system that forces air across the first heat exchanger or the second heat exchanger and directs the air into the cabin of the vehicle.

In example implementations where the system is reversible, the inlet 708 may be referred to as an expander-side of heat exchanger and the outlet 710 may be referred to as the compressor-side of the heat exchanger. The inlet and outlet may attached to such components. The system may include a reversal valve or other similar mechanism. The heat exchanger may extends along one side of the battery modules and/or the battery compartment as shown, or may extend along at least two opposing sides of the battery modules, e.g., along both vertical walls of the battery compartment.

Figure 8:
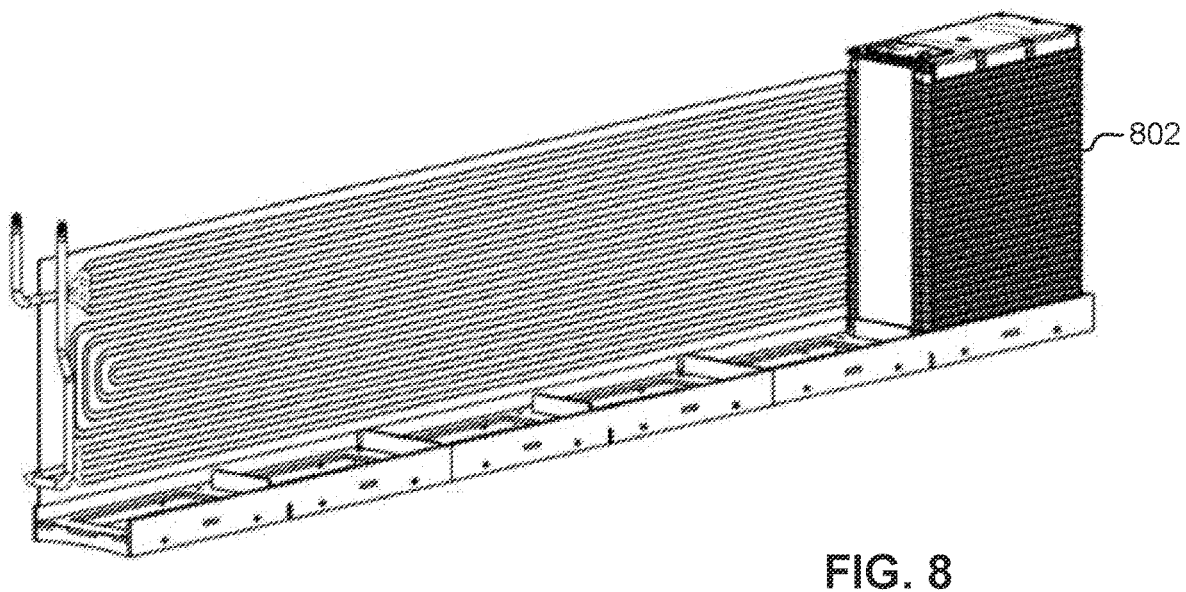
FIG. 8 is a perspective view of the heat exchanger of FIG. 5 with one stack of cells added.

FIG. 8 is a perspective view of the heat exchanger of FIG. 5 with one stack of cells added. FIG. 8 includes a single stack 802 of cells. As mentioned, when fully assembled, 5 other stacks may be in the system.

The heat exchanger may include a tube or set of tubes that extends longitudinally along a length of the battery stacks/modules and/or along the battery compartment. The tubes may wind back longitudinally at the ends of the battery compartment or set of modules. For example, the tubes may be primarily aligned horizontally, extending from the front end of the cabin towards the rear end of the cabin. The compressor-end of the heat exchanger and an expander-end of the heat exchanger may be positioned at a same end of the battery compartment/stacks of batteries. An individual length of tube may contact an individual tray in one of the stacks along an outside edge of the individual tray and/or along an entire length of the individual tray.

The vehicle may include a motor compartment at a front end of the vehicle forward of, and external to, the cabin. The motor compartment may, for example, be adjacent to and/or at least partially formed by the front wall 112. The motor compartment may be wholly enclosed, partially enclosed, or predominantly open. A second heat exchanger may be positioned in the motor compartment.

The ventilation system may be switchable between forcing air across the heat exchanger next to the batteries and forcing the air across the second heat exchanger. The ventilation system, and/or the heating and cooling system generally, may include or be electronically controlled by a controller. The controller may store instructions executable by the controller that cause the ventilation system to automatically switch between forcing the air across the first heat exchanger and forcing the air across the second heat exchanger. For example the controller may determine, based on one or more climate control inputs received by the controller, whether a climate mode for the cabin is a cooling mode or a heating mode. Such inputs may be received through one or more user interfaces in the cabin or on a smartphone wirelessly communicating with the controller.

The first heat exchanger may be acting as the condenser and the second heat exchanger may be acting as the evaporator. If the climate mode is in a cooling mode, the controller may cause the ventilation system to force the air across the second heat exchanger and into the cabin. If the climate modes is in a heating mode, the controller may cause the ventilation system to force the air across the first heat exchanger and into the cabin. The reverse may be true in various implementations. The first heat exchanger may be acting as the evaporator and the second heat exchanger may be acting as the condenser. If the climate mode is in cooling mode, the controller may cause the ventilation system to force air across the first heat exchanger and into the cabin. If the climate mode is in heating mode, the controller may cause the ventilation system to force the air across the second heat exchanger and into the cabin.

The controller may store instructions that, when executed, cause the reversing valve to switch. For example, the controller may cause the reversing valve to switch based on a temperature input of the battery module received by the controller. If the first heat exchanger is the evaporator and a battery temperature indicated by the temperature input is below a minimum threshold temperature, the controller may switch the reversing valve so that the first heat exchanger becomes the condenser. If the first heat exchanger is the condenser and the battery temperature is above a maximum threshold temperature, the controller may switch the reversing valve so that the first heat exchanger becomes the evaporator.

Figure 9:
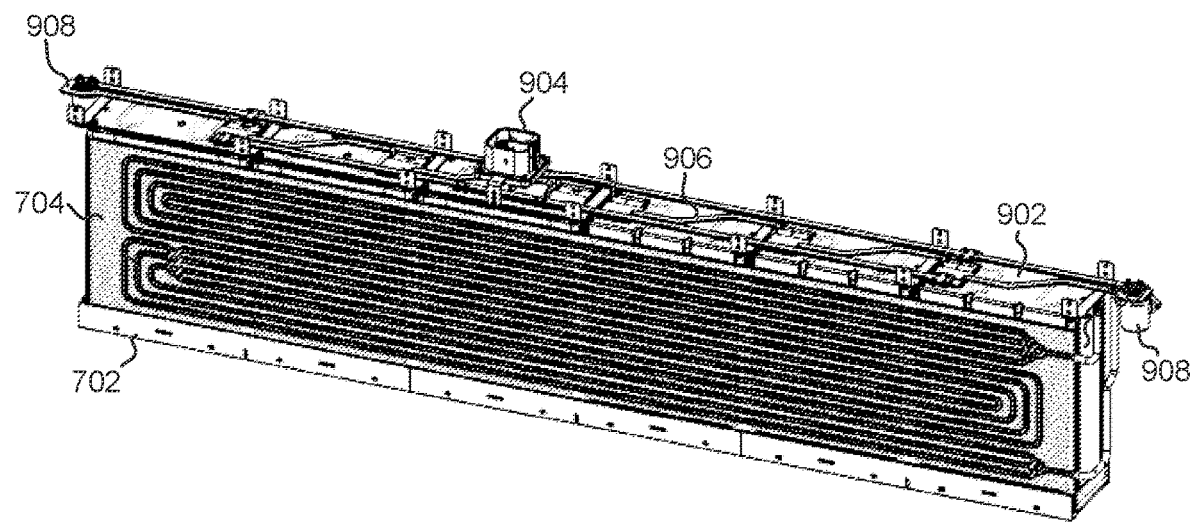
FIG. 9 is a perspective view of the rear of the battery system showing the heat exchanger.

FIG. 9 is a perspective view of the rear of the battery system showing the heat exchanger. FIG. 9 shows a fully assembled battery system, with the base 702 and the heat transfer wall 704. A manual shutoff or disconnect switch 904 is included on top of the system. Naturally, this is configured to be accessible in an emergency and during maintenance. The top 902 of a stack is also depicted, showing the conductors 906 used to connect the stacks to each other. A junction box 908 is placed at each side of the battery.

In various implementations, the vehicle may have two or more separate stacks of batteries. The heating and cooling system may, in some such implementations, include separate heat exchange circuits for each of the stacks.

Figure 10:
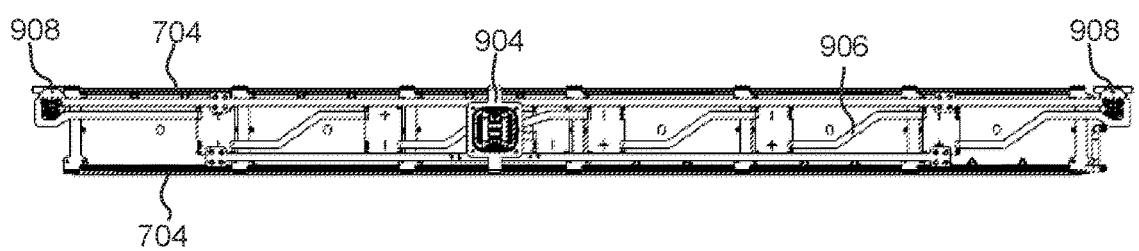
FIG. 10 is a top view of the battery system.

FIG. 10 is a top view of the battery system. This FIG. 10 shows that there may be a heat transfer wall 704 on both sides of the system.

Figure 11:
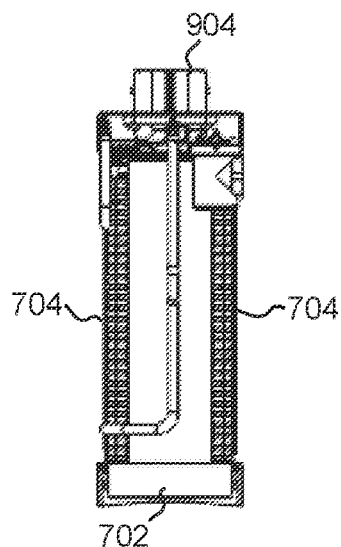
FIG. 11 is a view of one end of the battery system.
Figure 12:
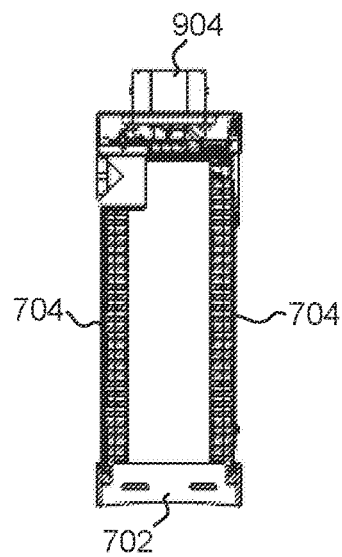
FIG. 12 is a view of the other end of the battery system.

FIG. 11 is a view of one end of the battery system. FIG. 12 is a view of the other end of the battery system. FIGS. 11 and 12 are views of both ends of the battery system. These views show the deployment of the two heat transfer walls 704 on both sides of the system.

FIG. 13 is an exploded view of the cells and heat transfer plates for a stack of cells.

Figure 14:
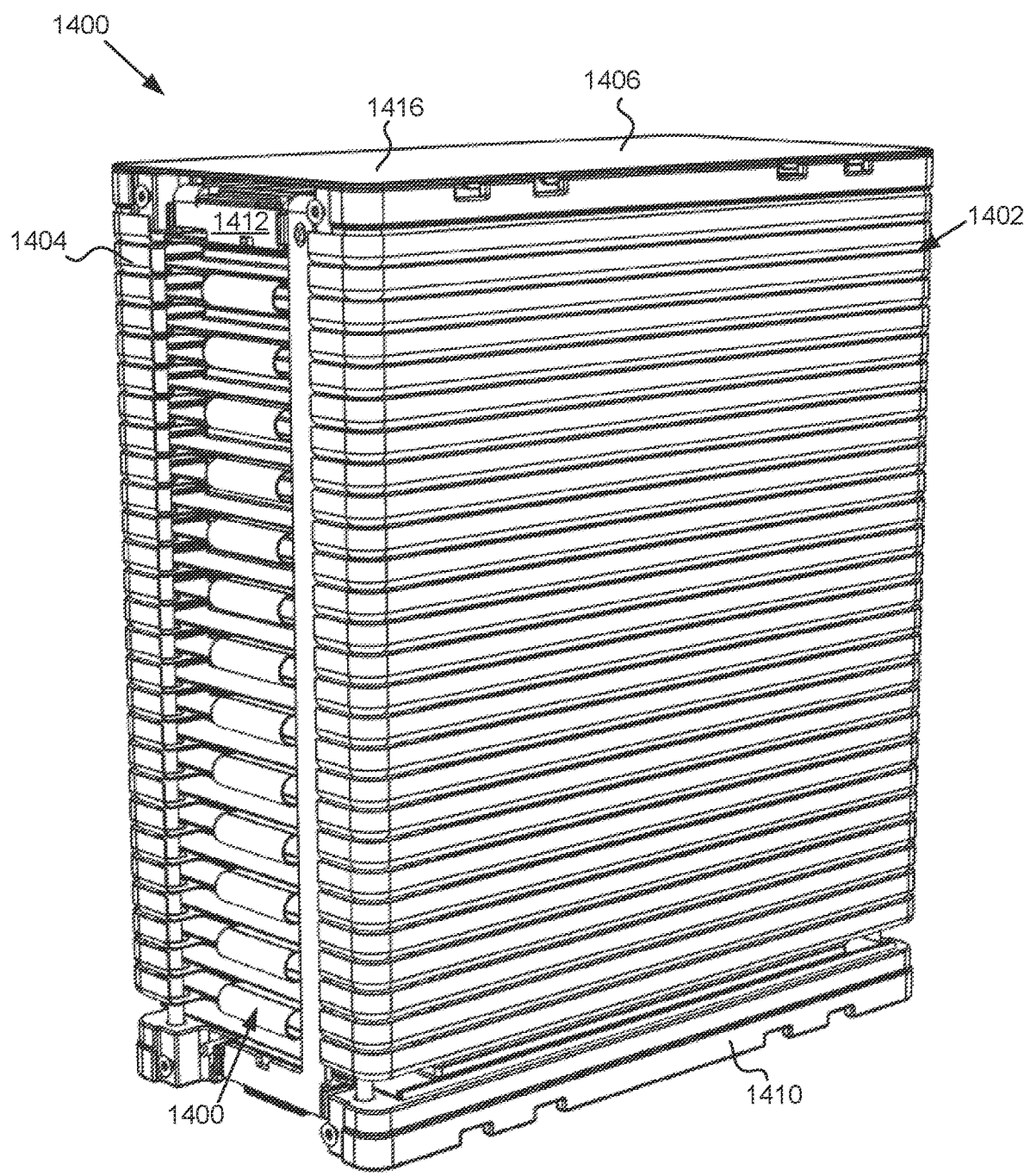
FIG. 14 is a perspective view of the assembled stack of cells and heat transfer plates.

FIG. 14 is a perspective view of the assembled stack 1400 of cells and heat transfer plates. As can be seen, the cells 1402 are fairly well surrounded by the heat transfer plates 1404. It can also be seen that each heat transfer plate 1404 includes a wide surface for contacting the heat transfer walls on each side. The cell terminals 1408 are visible, as are the exposed terminals 1412 and 1414 that can be attached to the busbars. A top cap 1406 is made from an electrically insulating material and includes surface features for receiving the cell stack terminals. A bottom cap 1410 is also made from an electrically insulating material and is configured to help keep the cell stack 1400 in the base.

As noted above, the system may be designed so as to provide heat and even cooling to the cabin of the vehicle. Heating of the cabin can be accomplished by transferring heat taken away from the cells in the battery to the cabin. In its simplest form, this is accomplished by blowing air across the heat transfer wall and into the cabin. The heating and cooling system may include a variable speed fan, along with ducts connecting to vents inside the cabin.

Cooling of the cabin is accomplished, for example, by using the heat pump to create chilled surfaces on the heat transfer walls or somewhere else in the system. Air can be blown across these chilled surfaces to produce chilled air for the cabin. The same variable speed fan, ducts and vents are used.

Figure 15:
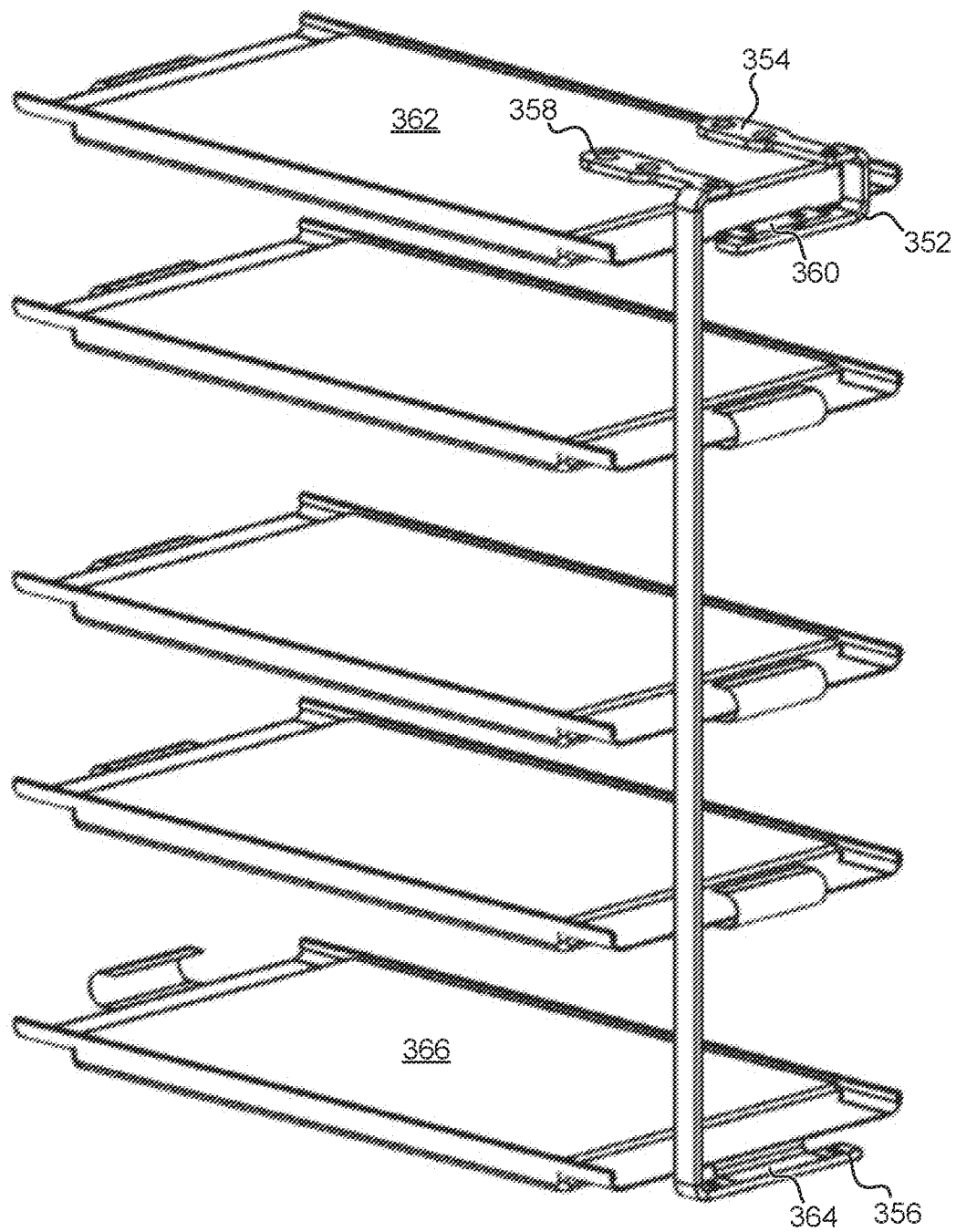
FIG. 15 is a perspective view of hardware that connects the cells in the stack to the rest of the battery.

FIG. 15 is a perspective view of hardware that connects the cells in the stack to the rest of the battery. FIG. 15 illustrates how the current may be collected from each stack. In particular, a busbar 352 is located at the stop of the stack and is configured to be mechanically and electrically connected to the exposed cell terminal 360 of the top cell. The busbar 252 includes a stack terminal 354, to which a conductor is attached. A busbar 356 has an end at the bottom of the stack, which is adapted to be mechanically and electrically connected to the cell terminal 364 of the bottom cell 366. The busbar 356 includes a stack terminal 358 of opposite polarity to the stack terminal 354, to which a conductor is attached.

Figure 16:
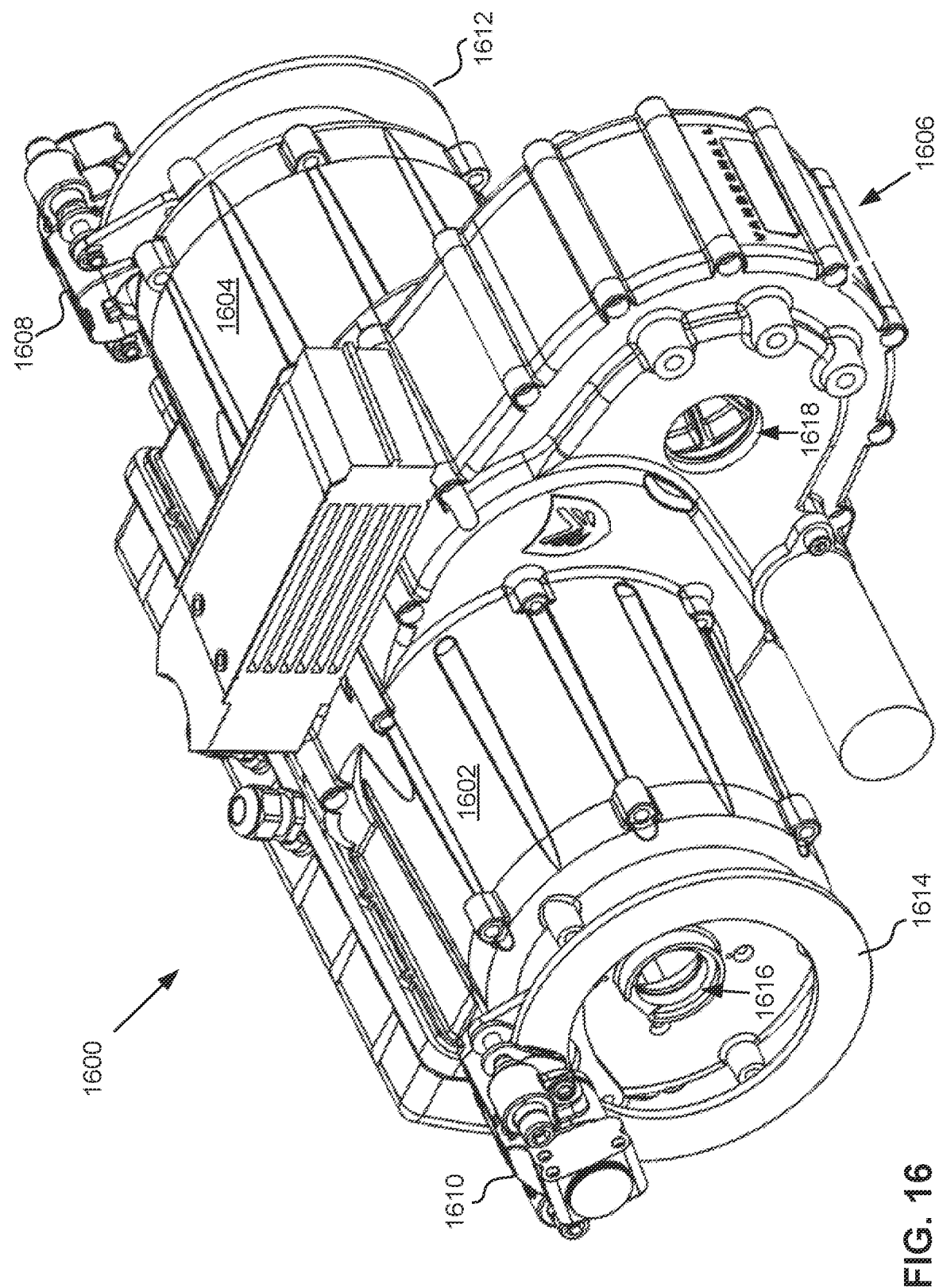
FIG. 16 is a perspective view of a pair of combined motor and brake units.

FIG. 16 is a perspective view of a pair of combined motor and brake units. Turning to the FIGs., FIG. 16 is a perspective view of a pair of the combined motor and brake units 1600. As shown in FIG. 2, the vehicle may include one such pair 202 toward the front of the vehicle and another pair 202 toward the rear of the vehicle. As such, the vehicle may have 4-wheel drive.

Alternatively, the vehicle is a three-wheel vehicle, such as the autocycles shown in FIGS. 22 and 24. In three-wheel vehicles, one pair of combined motor and brake units may independently drive and brake the front two wheels.

Returning to FIG. 16, the motors and transmissions for each of the two units are contained within the housing 1602. As shown here, the two motors are in the two halves of the upper portion of the housing 1604, while the transmissions are contained in the lower portion 1606. The output of the transmission is shown at 1618.

As shown in this FIG. 16, the motor and brake unit may include a single housing to contain the pair of motors and to support the pair of braking mechanisms. In various implementations, each motor, transmission and brake mechanism may have its own housing. In various implementations, the housings may include one or more mechanisms to attach to one another, such as bolt holes, latches, and so forth.

Figure 17:
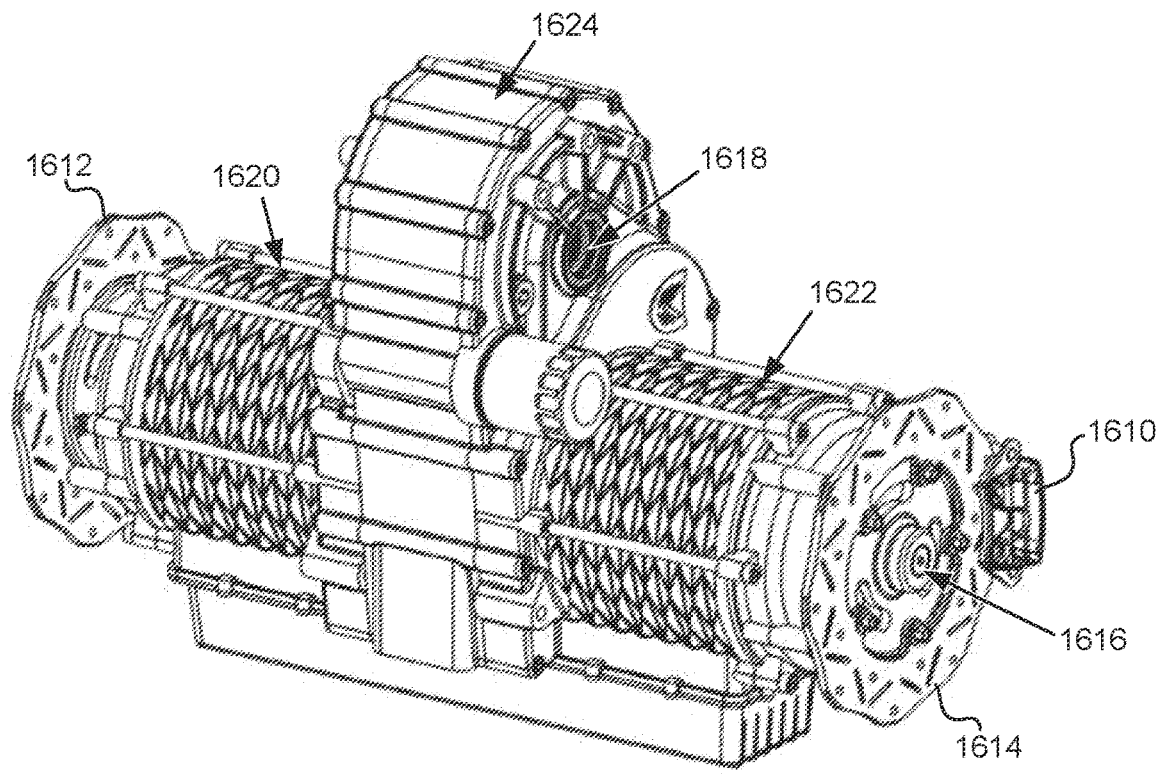
FIG. 17 is perspective view of a pair of combined motors and brakes with the housing removed.
Figure 18:
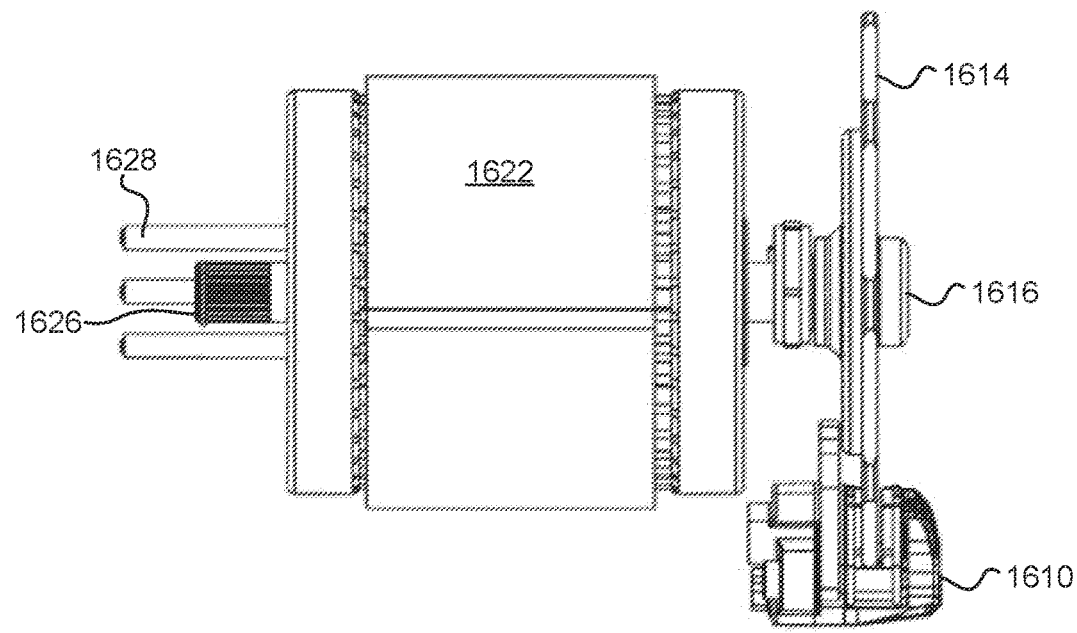
FIG. 18 is a top view of a combined motor and brake.
Figure 19:
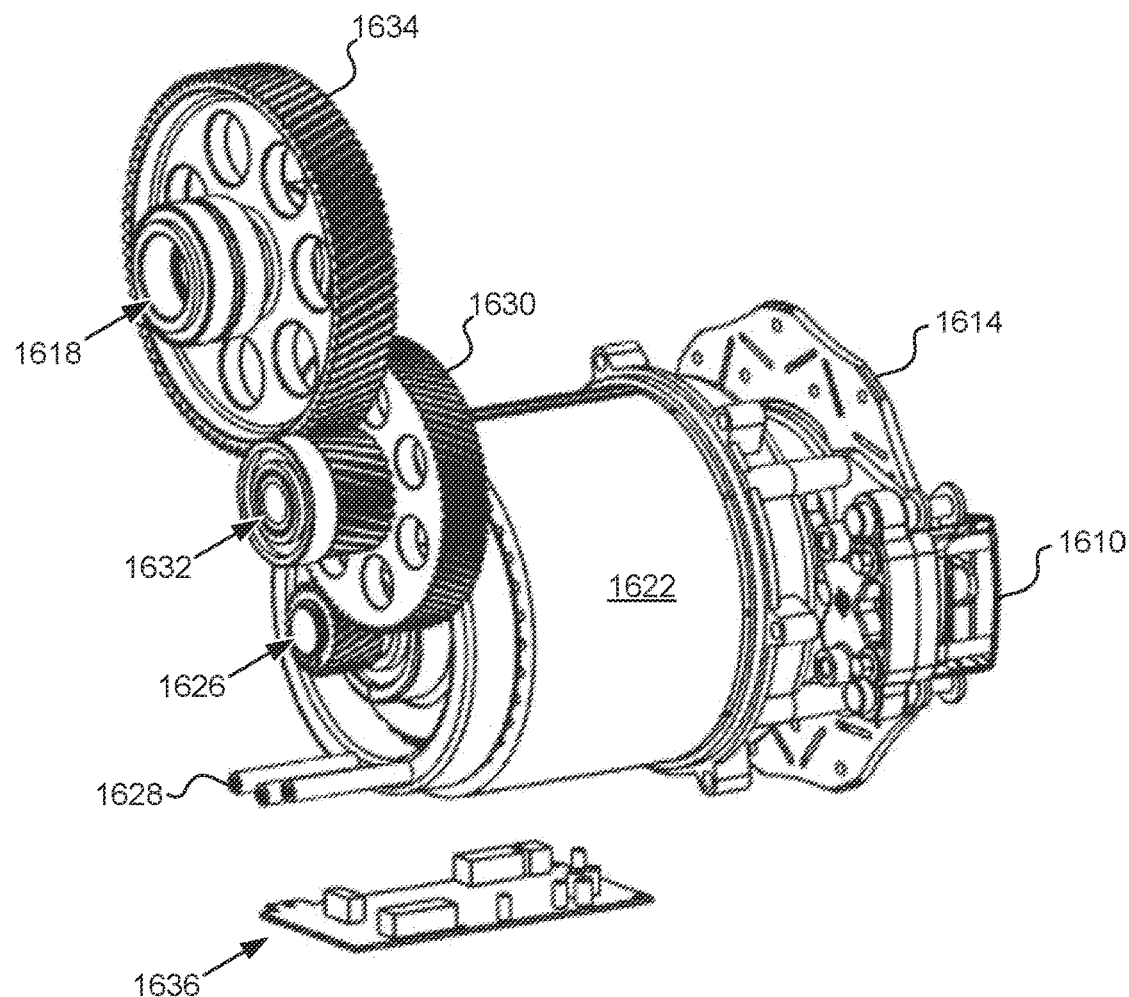
FIG. 19 is a perspective view illustrating the stepdown gearing.

Attached on the two sides of the housing 1602 are a first caliper 1608 and a second caliper 1610 for the braking devices. A first disc 1612 and a second disc 1614 are fixed to and rotate with the shaft of each of the motors, see 1616. This "disc brake" is also seen in FIGS. 17-19, where the same numerals are used to show the same components.

As noted above, it is an advantage to combine the motor and brakes into a single unit. It is also an advantage to attach the brake directly to the motor shaft. In this way, the discs and caliper mechanisms are located higher on the vehicle and in a more protected spot, as compared to the normal location on the wheel. This may be useful on an off-road vehicle. Also, because the transmission may gear down the rotation of the motor to the wheels, applying the braking power to the faster rotating motor shaft may allow finer braking adjustments on the motor shaft, which has lower torque than the wheel.

A vehicle may include two sets of motor and brake units 1600 or four individual motor and brake units. As such, the vehicle may include a front-left combined motor and brake unit coupled to a front-left drive axle of the vehicle and corresponding to a front-left wheel of the vehicle, a front-right combined motor and brake unit coupled to a front-right drive axle of the vehicle and corresponding to a front-right wheel of the vehicle, a rear-left combined motor and brake unit coupled to a rear-left drive axle of the vehicle and corresponding to a rear-left wheel of the vehicle; and a rear-right combined motor and brake unit coupled to a rear-right drive axle of the vehicle and corresponding to a rear-right wheel of the vehicle.

In various implementations, a first motor and brake unit may be coupled by its housing to a housing of a second motor and brake unit. In other implementations, the first and second motor and brake units may share a housing. The discs and calipers may be disposed at outward ends of the housing with respect to the vehicle. The braking mechanism of the first unit may be at an opposite end of the housing from the second unit. The transmissions may be is disposed at an inward end of the housing, e.g., in the middle of the housing. The transmission of the first unit may be adjacent to or otherwise next to the transmission of the second unit.

FIG. 17 is perspective view of a pair of combined motors and brakes with the housing removed. FIG. 17 shows the same pair of units as in FIG. 16, with part of the housing removed to expose the motors 1620 and 1622. The motors may be BLDC (brushless DC) motors. Naturally, the size and horsepower ratings of the motors is selected based on the size and function of the vehicle. Currently, with the off-road vehicle shown in FIG. 1, the 4 motors are each rated at over 100 horsepower and 120 lb-ft of torque. The two transmissions are contained in the lower, central portion of the housing 1624.

FIG. 18 is a top view of a combined motor and brake. FIG. 18 shows the motor 1622 with the disc 1614 attached to one end of the shaft 1616 and the worm gear teeth cut into the output end of the shaft 1626. Power cables 1628 are also shown.

FIG. 19 is a perspective view illustrating the stepdown gearing. FIG. 19 shows a transmission with the housing removed. Basically, the transmission, sometimes referred to as a gear box, is designed to couple the motor to the wheel that it drives. The transmission may be a step-down transmission, i.e. to increase torque in the wheels, the transmission steps down the rotational speed of the motor. In the implementation shown in FIG. 19, this is accomplished by the shaft driving a toothed wheel 1630 with a greater diameter than the drive shaft 1626. The wheel 1630 is fixed to the toothed wheel 1632, which has a smaller diameter than the wheel 1630. The wheel 1632 drives a tooth wheel 1634, which has a larger diameter than the wheel 1632. In the implementation shown, the ratio of the wheel 1630 to the drive shaft 1626 is about 3 to 1. Likewise, the ratio of the wheel 1634 to the wheel 1632 is about 3 to 1. As such, the depicted transmission steps down the rotation of the motor by a factor of about 9. Certainly, other ratios and other types of transmissions can be used. Nevertheless, for an off-road vehicle, a step down to achieve higher torque at the wheels may be employed.

FIG. 19 also shows a motor control board 1636. The design of the motor control board is selected to match the performance expectations for the vehicle. The motor control board may include a controller electronically coupled to one or more motor and brake units. The controller may store instructions executable by the controller that cause independent operation of the separate motor and brake units.

In various implementations of vehicles with two or more motor and brake units, each unit may have its own controller. Each controller may store instructions for specific operation of the motor and brake unit based on which wheel the unit drives and a control input received from a control mechanism of the vehicle. In one example, the control input may be a steering input. The controllers for the units on the left side of the vehicle may cause the units to turn the wheels in a first direction. The controllers for the units on the right side of the vehicle may cause the units to turn the wheels in the opposite direction. As a result, the vehicle may turn as if in a tank-steer mode.

In various implementations, the vehicle may include sensors corresponding to one or more, or all, of its wheels. The motor controller or motor controllers may include instructions for receiving and interpreting signals from these sensors. For example, the sensors may be speed sensors and the motor controller may cause a change in a speed of the wheels, through the motors, based on signals received from the speed sensors. The sensors may, for example, include a rotational speed sensor, an inertial sensor, and/or an orientation sensor. The controller may be programmed to optimize a traction, stability, or otherwise control of the vehicle based on signals received from these sensors. The controller may be programmed to cause regenerative braking by the electric motor. The controller may be programmed to cause the braking mechanisms to apply a braking force automatically based, for example, on a speed of the vehicle during regenerative braking.

Figure 20:
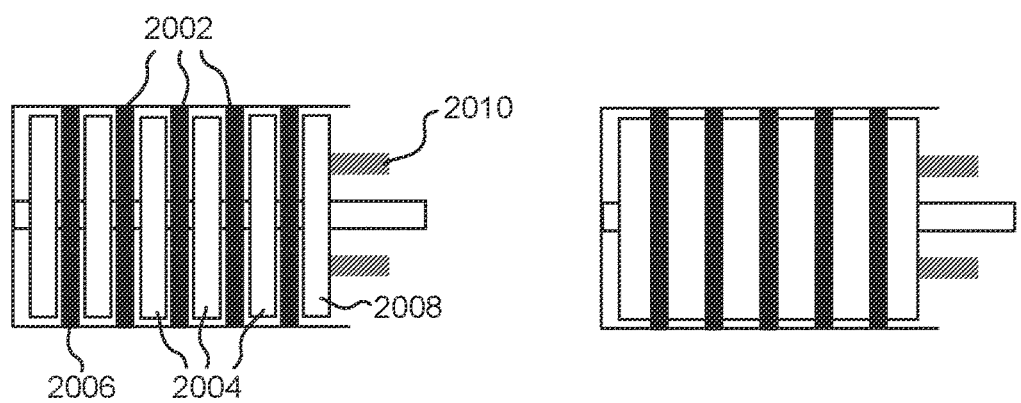
FIG. 20 is a schematic view of an alternative brake mechanism

FIG. 20 is a schematic view of an alternative brake mechanism. FIG. 20 depicts an alternative mechanism useful for braking. This alternative mechanism is known as a rotor/stator brake. It makes use of rotor discs 2004, which are keyed to rotate with the motor shaft. The brake also includes stator discs 2002, which are keyed to the stationary part of the brake. The system includes a stationary end plate 2006. A pressure plate 2008 is translatable by the pistons 2010. In the non-braking condition, the pressure plate is translated away from the stack and the rotor disc rotate next to the stator disc without interference. Braking is effected by translating the pressure plate into the stack, so as to cause the rotor discs and stator discs to rub against each other. The greater the pressure applied by the pressure plate, the greater the stopping power. In this alternative brake mechanism, the stator and rotor discs may be surrounded by a fluid, for the purpose of heat dissipation and lubrication.

The disc brake system and/or the rotor/stator brake system may be used in addition to regenerative braking. Regenerative braking allows one to recover energy while slowing down the moving vehicle by converting the kinetic energy into electric energy that can be stored in the battery. In this way, the vehicle recovers energy that would otherwise be lost to the brake discs as heat. The principles of regenerative braking are known. Basically, the motor is switched from a motor to a generator and the power generated is fed into the battery. It is also known that regenerative braking cannot be used on its own, as it greatest impact is at higher speeds and has almost not braking power at lower speeds.

In order to take full advantage of four motor and break units independently driving and braking the four wheels of a vehicle, it is important to include various sensors on the vehicle. For example, the signals from independent wheel speed sensors on each wheel can be used by the processor in the vehicle control module to speed up or slow down a given wheel has lost traction. See the discussion of U.S. Patent Application No. 2020-0198606. Input from inertial sensors can also be used to determine if the vehicle is losing traction or control and the processor can automatically adjust the power to the motor or the braking of individual wheels to correct the situation. Orientation sensors can also be used to detect worrisome conditions and adjustments be made through the motors and/or brakes.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. An electric vehicle comprising:
a frame;
four wheels;
four suspension arms, each suspension arm pivotally attached to the frame, each suspension arm coupling one of the four wheels to the frame;
at least one electric motor supported on the frame, and configured to drive at least one of the four wheels;
a battery of rechargeable cells configured to power the at least one electric motor;
wherein the battery is housed within a battery compartment disposed above the frame, between a driver's side seat well and a passenger's side seat well, and along more than one third of a longitudinal centerline of the vehicle, and wherein a longitudinal length of the battery compartment is more than three times the width of the battery compartment, and wherein a top surface of the battery compartment provides an arm rest between the driver's side seat well and the passenger's side seat well.

2. The electric vehicle of claim 1, wherein the longitudinal length of the battery compartment is more than half of the longitudinal length of the vehicle.

3. The electric vehicle of claim 1, wherein the longitudinal length of the battery compartment is more than four times the width of the battery compartment.

4. The electric vehicle of claim 1, wherein the battery compartment is sized to house more than one battery, to thereby provide the option of carrying multiple batteries to provide longer run times between charging.

5. The electrical vehicle of claim 1, wherein the electric vehicle is an off-road vehicle with a ground clearance of at least 12 inches.

6. The electric vehicle of claim 5, wherein the ground clearance is at least 18 inches.

7. The electric vehicle of claim 1, wherein the battery compartment comprises an access panel on a top side.

8. The electric vehicle of claim 7, wherein the battery compartment includes padding on its top and sides.

9. The electric vehicle of claim 1, further comprising an active cooling system for the battery.

10. The electric vehicle of claim 1, further comprising a system for active cooling and warming of the battery.

11. An off-road electric vehicle comprising:
a frame;
four wheels;
four suspension arms, each suspension arm pivotally attached to the frame, each suspension arm coupling one of the four wheels to the frame;
four electric motors supported on the frame, each motor configured to drive one of the four wheels;
a battery of rechargeable cells configured to power the four electric motors;
wherein the battery is housed within a battery compartment disposed above the frame, disposed between a driver's side seat well and a passenger's side seat well, and along more than half of a longitudinal centerline of the vehicle, and wherein a longitudinal length of the battery compartment is more than four times the width of the battery compartment, and wherein a top surface of the battery compartment provides an arm rest between the driver's side seat well and the passenger's side seat well.

12. The off-road electric vehicle of claim 11, having a ground clearance of at least 12 inches.

13. The off-road electric vehicle of claim 12, wherein the ground clearance is at least 18 inches.

14. The off-road electric vehicle of claim 11, wherein the battery compartment extends above and between a driver's feet and front passenger's feet.

15. The off-road electric vehicle of claim 11, wherein the battery compartment comprises padding on its top.

16. The off-road electric vehicle of claim 11, wherein the battery compartment comprises an access panel on a top side.

17. The off-road electric vehicle of claim 11, wherein the battery compartment comprises padding on its top and sides.

18. The off-road vehicle of claim 11, further comprising an impact plate forming a bottom component of the battery compartment.

19. The off-road vehicle of claim 11, wherein the battery compartment is sized to house more than one battery, to thereby provide the option of carrying multiple batteries to provide longer run times between charging.

\* \* \* \* \*